(12) United States Patent
Chen et al.

(10) Patent No.: US 11,570,798 B2
(45) Date of Patent: Jan. 31, 2023

(54) DATA TRANSMISSION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/622,855

(22) PCT Filed: Aug. 10, 2017

(86) PCT No.: PCT/CN2017/096844
§ 371 (c)(1),
(2) Date: Dec. 13, 2019

(87) PCT Pub. No.: WO2019/028745
PCT Pub. Date: Feb. 14, 2019

(65) Prior Publication Data
US 2020/0229218 A1 Jul. 16, 2020

(51) Int. Cl.
*H04W 72/12* (2009.01)
*H04W 72/04* (2009.01)
(Continued)

(52) U.S. Cl.
CPC ...... *H04W 72/1268* (2013.01); *H04B 7/0408* (2013.01); *H04B 7/0626* (2013.01);
(Continued)

(58) Field of Classification Search
CPC ........... H04W 72/1268; H04W 72/042; H04W 72/048; H04W 72/1289; H04W 76/27;
(Continued)

(56) References Cited

U.S. PATENT DOCUMENTS

2010/0098012 A1  4/2010  Bala et al.
2011/0243012 A1  10/2011 Luo et al.
(Continued)

FOREIGN PATENT DOCUMENTS

CN   102082645 A   6/2011
EP   2385647 A2    11/2011
(Continued)

OTHER PUBLICATIONS

Extended European Search Report for EP Application 17921059.6 dated Jun. 15, 2020.
(Continued)

*Primary Examiner* — Candal Elpenord
(74) *Attorney, Agent, or Firm* — Young Basile Hanlon & MacFarlane, P.C.

(57) ABSTRACT

Provided are a data transmission method, a network device and a terminal device. The method comprises: generating first instruction information, the first instruction information being used to instruct a terminal device to simultaneously send multiple pieces of uplink information corresponding to multiple downlinks over multiple uplink channels, or the first instruction information being used to instruct the terminal device to send multiple pieces of uplink information over multiple uplink channels by means of a manner of a time-division multiplexing, or the first instruction information being used to instruct the terminal device to send multiple pieces of uplink information over a first uplink channel among multiple uplink channels; sending the first instruction information to the terminal device.

20 Claims, 3 Drawing Sheets

(51) Int. Cl.
   *H04W 76/27*     (2018.01)
   *H04W 80/02*     (2009.01)
   *H04W 16/28*     (2009.01)
   *H04B 7/0408*    (2017.01)
   *H04B 7/06*      (2006.01)

(52) U.S. Cl.
   CPC ......... *H04W 16/28* (2013.01); *H04W 72/042* (2013.01); *H04W 72/048* (2013.01); *H04W 72/1289* (2013.01); *H04W 76/27* (2018.02); *H04W 80/02* (2013.01)

(58) Field of Classification Search
   CPC .... H04W 16/28; H04W 80/02; H04B 7/0408; H04B 7/0626
   USPC .................................................. 370/329–330
   See application file for complete search history.

(56) References Cited

U.S. PATENT DOCUMENTS

| | | | |
|---|---|---|---|
| 2012/0113827 | A1 | 5/2012 | Tamada et al. |
| 2014/0314031 | A1* | 10/2014 | Kim ........................ H04L 5/001 370/329 |
| 2016/0127090 | A1* | 5/2016 | Takeda .................. H04W 16/32 370/329 |
| 2018/0368188 | A1* | 12/2018 | Aiba ................ H04W 74/0833 |
| 2019/0124631 | A1* | 4/2019 | Ren ..................... H04W 72/042 |
| 2020/0008231 | A1* | 1/2020 | Vilaipornsawai ...... H04B 7/088 |
| 2020/0154467 | A1* | 5/2020 | Gong .................... H04W 24/08 |
| 2020/0177254 | A1* | 6/2020 | Lee ................... H04W 56/0045 |
| 2020/0204221 | A1* | 6/2020 | Tong ..................... H04L 5/0051 |
| 2020/0221429 | A1* | 7/2020 | Li .......................... H04L 5/0053 |
| 2021/0195639 | A1* | 6/2021 | Kim .................... H04W 74/006 |

FOREIGN PATENT DOCUMENTS

| | | |
|---|---|---|
| EP | 2582075 A2 | 4/2013 |
| JP | 2012506671 A | 3/2012 |
| JP | 2013531905 A | 8/2013 |
| RU | 2546597 C2 | 4/2015 |
| RU | 2577318 C2 | 3/2016 |
| TW | 201220739 A | 5/2012 |
| WO | 2016121915 A1 | 8/2016 |
| WO | 2017026159 A1 | 2/2017 |
| WO | 2017047445 A1 | 3/2017 |
| WO | 2017122959 A1 | 7/2017 |

OTHER PUBLICATIONS

Russia Office Action with English Translation for RU Application 2019137670/07(074387) dated Sep. 9, 2020.
3GPP TSG RAN WG1 Meeting #89; Hangzhou, China, May 15-19, 2017; R1-1707949.
3GPP TSG-RAN WG1 #89; Hangzhou, China, May 15-19, 2017; R1-1708674.
3GPP TSG-RAN WG1 #89; Hangzhou, China, May 15-19, 2017; R1-1707352.
3GPP TSG RAN WG1 Meeting #89; R1-1708151 Hangzhou, China, May 15-19, 2017.
3GPP TSG RAN WG1 Meeting #89; R1-1707666 Hangzhou, P.R. China, May 15-19, 2017.
3GPP TSG RAN WG1 Meeting #89; R1-1707417 Hangzhou, P.R. China, May 15-19, 2017.
Canada First Office Action for CA Application 3063498 dated Jan. 5, 2021.
India First Examination for IN Application 201917051785 dated Mar. 19, 2021.
Korean Office Action with English Translation for KR Application 1020197033978 dated Nov. 25, 2021. (10 pages).
Canadian Examination Report for CA Application 3063498 dated Sep. 10, 2021. (5 pages).
3GPP TSG Ran WG1 Meeting #92bis Sanya, China, R1-1803841, vivo, Other aspects on carrier aggregation, Apr. 16-20, 2018. (6 pages).
Japanese Office Action with English Translation for JP Application 2019-564076 dated Jul. 13, 2021. (12 pages).
Singapore invitation to Respond to Written Opinion for SG Application 11201910586W dated Aug. 3, 2021. (6 pages).
Communication pursuant to Article 94(3) EPC for EP Application 17921059.6 dated Jun. 10, 2021. (5 pages).
Chinese Second Office Action with English Translation for CN Application 2019564076 dated Feb. 25, 2022. (11 pages).
Japanese Notice of Reasons for Refusal with English Translation for JP Application 2019564076 dated Jul. 29, 2022. (6 pages).
Korean Notice of Final Rejection with English Translation for KR Application 1020197033978 dated May 23, 2022. (10 pages).
Canadian Examination Report for CA Application 3063498 dated Jul. 4, 2022. (5 pages).
Japanese Second Office Action with English Translation for JP Application 2019564076 dated Feb. 25, 2022. (11 pages).
Australian Examination Report for AU Application 2017427013 dated Sep. 29, 2022. (4 pages).
Korean Notice of Final Rejection with English Translation for KR Application 1020197033978 dated Sep. 1, 2022. (13 pages).
Singapore Second Written Opinion for SG Application 11201910586W dated Dec. 2, 2022. (8 pages).

* cited by examiner

DATA TRANSMISSION METHOD, NETWORK DEVICE AND TERMINAL DEVICE

CROSS-REFERENCE TO RELATED APPLICATION(S)

This application is a 371 application of International Application No. PCT/CN2017/096844, filed on Aug. 10, 2017, the entire disclosure of which is hereby incorporated by reference.

TECHNICAL FIELD

Implementations of the present disclosure relate to the communication field, and more particularly, to a data transmission method, a network device, and a terminal device.

BACKGROUND

At present, in a discussion about a New Radio (NR)/5-Generation (5G) mobile communication technology, there are two following types of approaches supported by solutions that multiple Transmission Reception Points (TRPs) or multiple Antenna panels or multiple beams simultaneously provide transmission for a terminal device. Specifically, a first approach is that the terminal device only receives one Physical Downlink Control Channel (PDCCH) indicating relevant indication information about data transmitted through multiple TRPs/beams. A second approach is that the terminal device receives different NR-PDCCHs from different TRPs/beams, and each control channel indicates relevant indication information about one corresponding data transmission.

However, for the second approach, the terminal device needs to simultaneously detect multiple PDCCHs/Physical Downlink Shared Channels (PDSCHs) on the same carrier, and needs to send uplink information on uplinks corresponding to multiple downlinks, causing too high complexity and power consumption of the terminal device.

SUMMARY

Provided are a data transmission method, a network device, and a terminal device.

In a first aspect, there is provided a data transmission method. The data transmission method includes: generating first indication information, wherein the first indication information is used for indicating a terminal device to simultaneously send multiple pieces of uplink information corresponding to multiple downlinks on multiple uplink channels, or the first indication information is used for indicating the terminal device to send the multiple pieces of uplink information on the multiple uplink channels in a time division multiplexing mode, or the first indication information is used for indicating the terminal device to send the multiple pieces of uplink information on a first uplink channel of the multiple uplink channels; and sending the first indication information to the terminal device.

In some possible implementations, generating the first indication information includes: generating the first indication information according to at least one piece of the following information: interaction capabilities between multiple Transmission Reception Points (TRPs) corresponding to the multiple downlinks, interaction capabilities between multiple beams corresponding to the multiple downlinks, interaction capabilities between multiple cells to which the multiple TRPs belong, interaction capabilities between multiple cells to which the multiple beams belong, report information of the terminal device, service information of the multiple downlinks, and network load information.

In some possible implementations, the report information includes at least one piece of the following information: capability information indicating whether the terminal device supports to send the multiple pieces of uplink information on the multiple uplink channels, information about a Multiple-Input Multiple-Output (MIMO) capability of the terminal device, level information of the terminal device, and a Power Headroom Report (PHR) of the terminal device.

In some possible implementations, sending the first indication information to the terminal device includes: sending a Radio Resource Control (RRC) signaling to the terminal device, wherein the RRC signaling includes the first indication information; or, sending a Media Access Control (MAC) Control Cell (CE) to the terminal device, wherein the MAC CE includes the first indication information.

In some possible implementations, sending the first indication information to the terminal device includes: sending first Downlink Control Information (DCI) to the terminal device, wherein the first DCI includes the first indication information.

In some possible implementations, sending the first Downlink Control Information (DCI) to the terminal device includes: sending the first DCI to the terminal device on a control channel corresponding to each downlink in the multiple downlinks; or sending the first DCI to the terminal device on a control channel corresponding to a first downlink of the multiple downlinks.

In some possible implementations, the method further includes: receiving the multiple pieces of uplink information sent by the terminal device.

In some possible implementations, receiving the multiple pieces of uplink information sent by the terminal device includes: when the first indication information is used for indicating the terminal device to send the multiple pieces of uplink information on the first uplink channel of the multiple uplink channels, receiving the multiple pieces of uplink information sent by the terminal device on a Physical Uplink Control Channel (PUCCH), wherein the multiple pieces of uplink information includes acknowledgement/non-acknowledgement information corresponding to each downlink in the multiple downlinks, and/or Channel State Information (CSI) corresponding to the each downlink in the multiple downlinks.

In some possible implementations, receiving the multiple pieces of uplink information sent by the terminal device includes: when the first indication information is used for indicating the terminal device to send the multiple pieces of uplink information on the first uplink channel of the multiple uplink channels, receiving the multiple pieces of uplink information sent by the terminal device on a Physical Uplink Shared Channel (PUSCH), wherein the multiple pieces of uplink information includes uplink data, or the multiple pieces of uplink information includes the uplink data and at least one piece of the following information: acknowledgement/non-acknowledgement information corresponding to each downlink in the multiple downlinks, and Channel State Information (CSI) corresponding to the each downlink in the multiple downlinks.

In some possible implementations, before receiving the multiple pieces of uplink information sent by the terminal device, the method further includes: sending an uplink (UL) grant message of the uplink data to the terminal device.

In some possible implementations, sending the uplink grant message of the uplink data to the terminal device includes: sending second Downlink Control Information (DCI) to the terminal device, wherein the second DCI includes the UL grant message.

In some possible implementations, sending the second Downlink Control Information (DCI) to the terminal device includes: sending the second DCI to the terminal device on a control channel corresponding to the each downlink in the multiple downlinks; or sending the second DCI to the terminal device on a control channel corresponding to a second downlink of the multiple downlinks.

In some possible implementations, sending the second Downlink Control Information (DCI) to the terminal device includes: selecting at least one downlink in the multiple downlinks; and sending the second DCI to the terminal device on the at least one downlink.

In some possible implementations, before sending the second Downlink Control Information (DCI) to the terminal device, the method further includes: generating second indication information, wherein the second indication information is used for indicating the terminal device to receive the second DCI on the at least one downlink; and sending the second indication information to the terminal device.

The method in the implementation of the present disclosure can effectively improve a success rate of detection of the terminal device.

In some possible implementations, selecting the at least one downlink in the multiple downlinks includes: selecting the at least one downlink in the multiple downlinks according to quality information and/or load information of the multiple downlinks.

In a second aspect, there is provided a data transmission method. The data transmission method includes: receiving first indication information sent by a network device, wherein the first indication information is used for indicating a terminal device to simultaneously send multiple pieces of uplink information corresponding to multiple downlinks on multiple uplink channels, or the first indication information is used for indicating the terminal device to send the multiple pieces of uplink information on the multiple uplink channels in a time division multiplexing mode, or the first indication information is used for indicating the terminal device to send the multiple pieces of uplink information on a first uplink channel of the multiple uplink channels; and sending the multiple pieces of uplink information to the network device according to the first indication information.

In some possible implementations, receiving the first indication information sent by the network device includes: receiving a Radio Resource Control (RRC) signaling sent by the network device, wherein the RRC signaling includes the first indication information; or receiving a Media Access Control (MAC) Control Cell (CE) sent by the network device, wherein the MAC CE includes the first indication information.

In some possible implementations, receiving the first indication information sent by the network device includes: receiving first Downlink Control Information (DCI) sent by the network device, wherein the first DCI includes the first indication information.

In some possible implementations, receiving the first Downlink Control Information (DCI) sent by the network device includes: receiving the first DCI sent by the network device on a control channel corresponding to any downlink of the multiple downlinks; or receiving the first DCI sent by the network device on a control channel corresponding to a first downlink of the multiple downlinks.

In some possible implementations, sending the multiple pieces of uplink information to the network device according to the first indication information includes: when the first indication information is used for indicating the terminal device to send the multiple pieces of uplink information on the first uplink channel of the multiple uplink channels, sending the multiple pieces of uplink information to the network device on a Physical Uplink Control Channel (PUCCH), wherein the multiple pieces of uplink information includes acknowledgement/non-acknowledgement information corresponding to each downlink in the multiple downlinks, and/or Channel State Information (CSI) corresponding to the each downlink in the multiple downlinks.

In some possible implementations, sending the multiple pieces of uplink information to the network device according to the first indication information includes: when the first indication information is used for indicating the terminal device to send the multiple pieces of uplink information on the first uplink channel of the multiple uplink channels, sending the multiple pieces of uplink information to the network device on a Physical Uplink Shared Channel (PUSCH), wherein the multiple pieces of uplink information includes uplink data, or the multiple pieces of uplink information includes the uplink data and at least one piece of the following information: acknowledgement/non-acknowledgement information corresponding to each downlink in the multiple downlinks, and Channel State Information (CSI) corresponding to the each downlink in the multiple downlinks.

In some possible implementations, before sending the multiple pieces of uplink information to the network device according to the first indication information, the method further includes: receiving an uplink (UL) grant message of the uplink data sent by the network device; wherein sending the multiple pieces of uplink information to the network device according to the first indication information includes: sending the multiple pieces of uplink information to the network device according to the first indication information and the UL grant message.

In some possible implementations, receiving the uplink (UL) grant message of the uplink data sent by the network device includes: receiving second Downlink Control Information (DCI) sent by the network device, wherein the second DCI includes the UL grant message.

In some possible implementations, receiving the second Downlink Control Information (DCI) sent by the network device includes: receiving the second DCI sent by the network device on a control channel corresponding to any downlink of the multiple downlinks; or receiving the second DCI sent by the network device on a control channel corresponding to a second downlink of the multiple downlinks; or receiving the second DCI sent by the network device on a control channel corresponding to each downlink in the multiple downlinks.

In some possible implementations, receiving the second Downlink Control Information (DCI) sent by the network device includes: receiving the second DCI sent by the network device on a control channel corresponding to at least one downlink of the multiple downlinks.

In some possible implementations, before receiving the second Downlink Control Information (DCI) sent by the network device, the method further includes: receiving second indication information sent by the network device, wherein the second indication information is used for indicating the terminal device to receive the second DCI sent by the network device on the at least one downlink, and the at least one downlink is a downlink selected by the network device in the multiple downlinks; wherein receiving the second DCI sent by the network device on the control channel corresponding to the at least one downlink of the multiple downlinks includes: receiving the second DCI sent by the network device on the control channel corresponding to the at least one downlink according to the second indication information.

In some possible implementations, before receiving the Downlink Control Information (DCI) sent by the network device, the method further includes: selecting the at least one downlink in the multiple downlinks.

In some possible implementations, selecting the at least one downlink in the multiple downlinks includes: selecting the at least one downlink in the multiple downlinks according to quality information and/or load information of the multiple downlinks.

In a third aspect, there is provided a network device. The network device includes a generating unit and a transceiving unit.

The generating unit is used for generating first indication information, wherein the first indication information is used for indicating a terminal device to simultaneously send multiple pieces of uplink information corresponding to multiple downlinks on multiple uplink channels, or the first indication information is used for indicating the terminal device to send the multiple pieces of uplink information on the multiple uplink channels in a time division multiplexing mode, or the first indication information is used for indicating the terminal device to send the multiple pieces of uplink information on a first uplink channel of the multiple uplink channels.

The transceiving unit is used for sending the first indication information to the terminal device.

In a fourth aspect, there is provided a network device. The network device includes a processor and a transceiver.

The processor is used for generating first indication information, wherein the first indication information is used for indicating a terminal device to simultaneously send multiple pieces of uplink information corresponding to multiple downlinks on multiple uplink channels, or the first indication information is used for indicating the terminal device to send the multiple pieces of uplink information on the multiple uplink channels in a time division multiplexing mode, or the first indication information is used for indicating the terminal device to send the multiple pieces of uplink information on a first uplink channel of the multiple uplink channels.

The transceiver is used for sending the first indication information to the terminal device.

In a fifth aspect, there is provided a terminal device. The terminal device includes a receiving unit and a sending unit.

The receiving unit is used for receiving first indication information sent by a network device, wherein the first indication information is used for indicating a terminal device to simultaneously send multiple pieces of uplink information corresponding to multiple downlinks on multiple uplink channels, or the first indication information is used for indicating the terminal device to send the multiple pieces of uplink information on the multiple uplink channels in a time division multiplexing mode, or the first indication information is used for indicating the terminal device to send the multiple pieces of uplink information on a first uplink channel of the multiple uplink channels.

The sending unit is used for sending the multiple pieces of uplink information to the network device according to the first indication information.

In a sixth aspect, there is provided a terminal device including a transceiver. The transceiver is used for receiving first indication information sent by a network device, wherein the first indication information is used for indicating a terminal device to simultaneously send multiple pieces of uplink information corresponding to multiple downlinks on multiple uplink channels, or the first indication information is used for indicating the terminal device to send the multiple pieces of uplink information on the multiple uplink channels in a time division multiplexing mode, or the first indication information is used for indicating the terminal device to send the multiple pieces of uplink information on a first uplink channel of the multiple uplink channels; and sending the multiple pieces of uplink information to the network device according to the first indication information.

In a seventh aspect, there is provided a computer readable medium for storing a computer program. The computer program includes instructions used for executing the method implementations of the first aspect or the second aspect.

In an eighth aspect, there is provided a computer chip. The computer chip includes an input interface, an output interface, at least one processor, and a memory. The at least one processor is used for executing codes in the memory. When the codes are executed, the processor may implement various processes executed by the network device in the data transmission method of the first aspect and various implementations thereof.

In a ninth aspect, there is provided a computer chip. The computer chip includes an input interface, an output interface, at least one processor, and a memory. The at least one processor is used for executing codes in the memory. When the codes are executed, the processor may implement various processes executed by the terminal device in the data transmission method of the second aspect and various implementations thereof.

In a tenth aspect, a communication system is provided, including the above network device and the above terminal device.

DETAILED DESCRIPTION

Technical solutions in the implementations of the present disclosure will be described with reference to the accompanying drawings.

Figure 1:
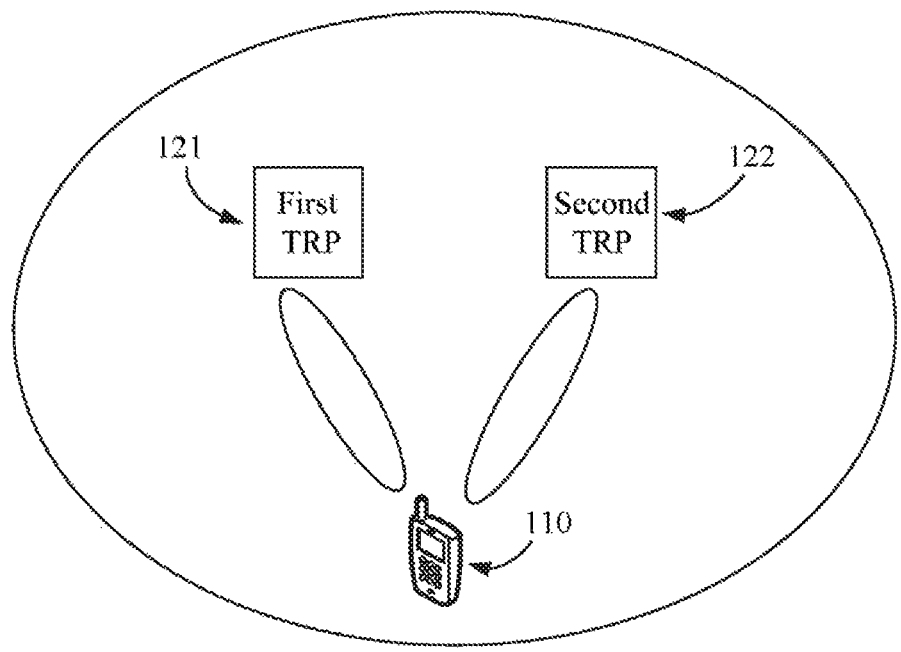
FIG. 1 is an example of an application scenario according to an implementation of the present disclosure.

FIG. 1 is an example diagram of a 5G communication system 100 according to an implementation of the present disclosure.

As shown in FIG. 1, the communication system 100 may include a terminal device 110, a first TRP 121 and a second TRP 122. The first TRP 121 and the second TRP 122 may respectively communicate with the terminal device 110 through air interfaces. Specifically, the first TRP 121 and the second TRP 122 may independently schedule one terminal device 110 for data transmission.

For example, the terminal device 110 detects PDCCHs from the first TRP 121 and the second TRP 122 respectively within one time slot to schedule multiple independent uplink data transmissions, and these independent uplink transmissions may be just scheduled into the same time slot.

However, under the communication system shown in FIG. 1, there may be multiple communication scenarios.

For example, the first TRP 121 and the second TRP 122 belong to the same cell, and a connection (backhaul) between the first TRP 121 and the second TRP 122 is ideal, that is, information interaction may be rapidly and dynamically performed.

For another example, the first TRP 121 and the second TRP 122 belong to the same cell, and the connection between the first TRP 121 and the second TRP 122 is non-ideal, that is, information interaction between the first TRP 121 and the second TRP 122 cannot be quickly performed, and relatively slow data interaction can only be performed.

For another example, the first TRP 121 and the second TRP 122 belong to different cells, and the connection between the first TRP 121 and the second TRP 122 is ideal.

For still another example, the first TRP 121 and the second TRP 122 belong to different cells, and the connection between the first TRP 121 and the second TRP 122 is non-ideal.

Since a network device may send different NR-PDCCHs/NR-PDSCHs from multiple TRPs to a terminal device, that is, the terminal device receives downlink information through multiple downlinks. Herein, each downlink has corresponding uplink information to be transmitted, and the uplink information includes at least one piece of the following information signals: acknowledgement/non-acknowledgement (ACK/NACK) corresponding to each downlink, report information such as Channel State Information (CSI) corresponding to each downlink, and uplink data.

It can be seen that if the terminal device 110 further needs to send uplink information on uplinks corresponding to multiple downlinks, too high complexity and power consumption of the terminal device will be caused.

Aiming at the above problems, an implementation of the present disclosure provides a data transmission method, which can effectively reduce too high complexity and power consumption of the terminal device through indicating a transmission mode of uplink signals for the terminal device by the network device.

Figure 2:
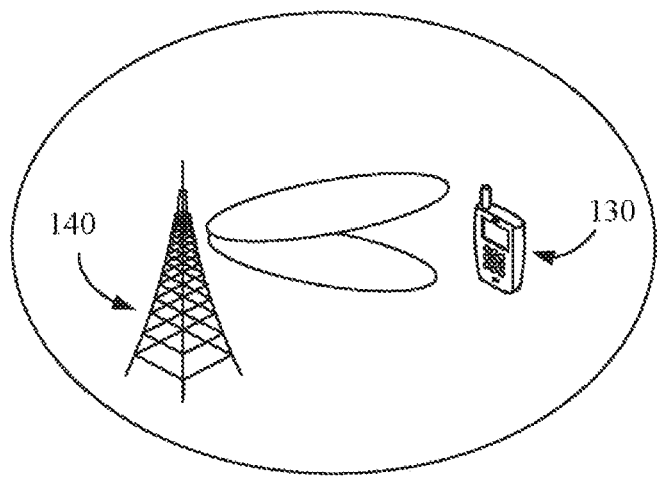
FIG. 2 is an example of an application scenario according to an implementation of the present disclosure.

It should be understood that the 5G communication system 100 is taken as an example for exemplarily describing the implementation of the present disclosure. However, the implementations of the present disclosure are not limited thereto. In other words, the technical solutions of the implementation of the present disclosure may be applied to any communication system in which multiple network devices can independently schedule a terminal to transmit data. For example, if TRPs in FIG. 1 correspond to beams, accordingly an example of an application scenario as shown in FIG. 2 may be obtained. The scenario includes a terminal device 130 and a network device 140, wherein there are multiple beams between the terminal device 130 and the network device 140.

For example, a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Time Division Duplex (TDD) system, and a Universal Mobile Telecommunication System (UMTS) system.

The present disclosure describes various implementations in combination with a network device and a terminal device.

The network device 140 may refer to any entity at a network side for sending or receiving signals. For example, it may be a user device for machine type communication (MTC), a Base Transceiver Station (BTS) in a GSM or CDMA, a NodeB in a WCDMA, an Evolutional Node B (eNB or eNodeB) in an LTE, a base station device in a 5G network, etc.

In addition, the terminal device 110 may be any terminal device. Specifically, the terminal device 110 may communicate with one or more core networks through a radio access network (RAN), and may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user device. For example, the terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, an on-board device, a wearable device, a terminal device in a 5G network or the like.

Figure 3:
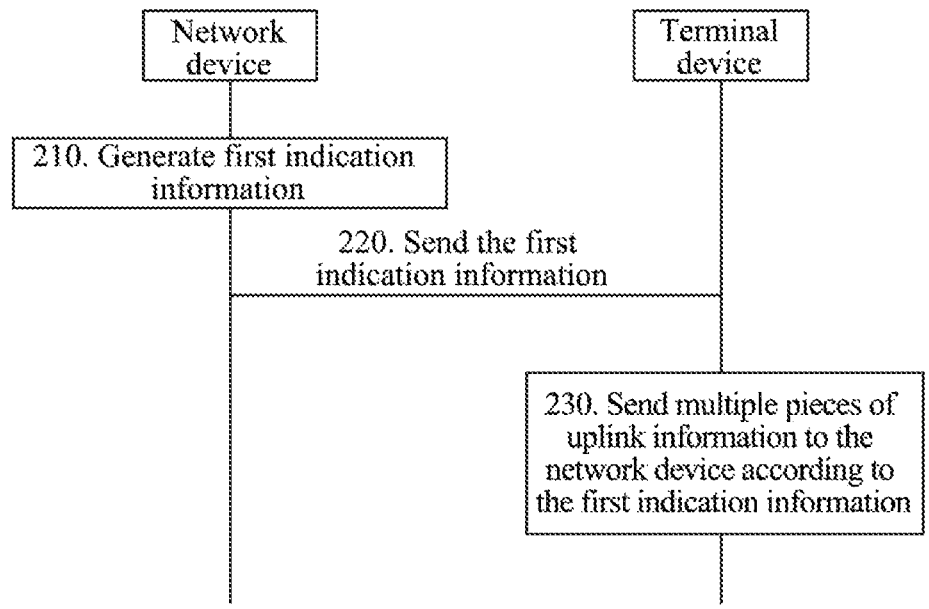
FIG. 3 is a schematic flowchart of a data transmission method according to an implementation of the present disclosure.

FIG. 3 is a schematic flowchart of a data transmission method according to an implementation of the present disclosure.

As shown in FIG. 3, the method includes the following acts 210, 220, and 230.

In 210, a network device generates first indication information.

In 220, the network device sends the first indication information to a terminal device.

In 230, the terminal device sends multiple pieces of uplink information to the network device according to the first indication information.

Specifically, the network device generates the first indication information, wherein the first indication information is used for indicating the terminal device to simultaneously send multiple pieces of uplink information corresponding to multiple downlinks on multiple uplink channels, or the first indication information is used for indicating the terminal device to send the multiple pieces of uplink information on multiple uplink channels in a time division multiplexing mode, or the first indication information is used for indicating the terminal device to send the multiple pieces of uplink information on a first uplink channel of the multiple uplink channels. The network device sends the first indication information to the terminal device.

In the implementation of the present disclosure, the multiple uplink channels are uplink channels corresponding to the multiple downlinks, the multiple downlinks are links for a terminal to receive downlink information, and each downlink has corresponding uplink information to be transmitted. It can be understood that the first indication information indicates the terminal device to simultaneously send uplink information corresponding to each downlink on multiple independent uplink channels; or, the first indication information indicates the terminal device to send uplink information corresponding to each downlink in a time division multiplexing (TDM) mode on multiple independent uplink channels; or, the first indication information indicates the terminal device to transmit uplink information corresponding multiple downlinks in a combination way by using a uplink channel.

In other words, after receiving the first indication information sent by the network device, the terminal device sends the multiple pieces of uplink information to the network device according to the first indication information.

A method for the network device to generate the first indication information in the implementation of the present disclosure is described exemplarily below.

Optionally, the network device may generate the first indication information according to at least one piece of the following information: interaction capabilities between multiple Transmission Reception Points (TRPs) corresponding to the multiple downlinks, interaction capabilities between multiple beams corresponding to the multiple downlinks, interaction capabilities between multiple cells to which the multiple TRPs belong, interaction capabilities between multiple cells to which the multiple beams belong, report information of the terminal device, service information of the multiple downlinks, and network load information.

Herein, the report information may include at least one piece of the following information: capability information indicating whether the terminal device supports to send the multiple pieces of uplink information on the multiple uplink channels, information about a Multiple-Input Multiple-Output (MIMO) capability of the terminal device, level information of the terminal device, and a Power Headroom Report (PHR) of the terminal device.

An implementation for the network device to send the first indication information to the terminal device is described below.

As one implementation, exemplarily, the network device may send a Radio Resource Control (RRC) signaling to the terminal device, wherein the RRC signaling includes the first indication information; or, the network device may send a Media Access Control (MAC) Control cell (CE) to the terminal device, wherein the MAC CE includes the first indication information. In other words, the terminal device may obtain the first indication information through the RRC signaling or the MAC CE.

As another implementation, exemplarily, the network device may send first Downlink Control Information (DCI) to the terminal device, wherein the first DCI includes the first indication information. In other words, the terminal device may obtain the first indication information through the first DCI.

In the implementation of the present disclosure, when the network device sends the first indication information through the first DCI, the terminal device may only receive one NR-PDCCH indicating relevant indication information about data transmitted on multiple TRPs/beams, or the terminal device may receive different NR-PDCCHs from different TRPs/beams, wherein each control channel indicates relevant indication information about data transmitted on multiple TRPs/beams.

In other words, the network device may send the first DCI to the terminal device on a control channel corresponding to each downlink in the multiple downlinks; or, the network device may send the first DCI to the terminal device on a control channel corresponding to a first downlink of the multiple downlinks.

For example, when the network device sends the first DCI to the terminal device on the control channel corresponding to each downlink in the multiple downlinks, the terminal device may receive the first DCI sent by the network device on a control channel corresponding to any downlink in the multiple downlinks.

For another example, when the network device sends the first DCI to the terminal device on the control channel corresponding to the first downlink of the multiple downlinks, the terminal device may receive the first DCI sent by the network device on the control channel corresponding to the first downlink.

In the implementation of the present disclosure, after receiving the first indication information, the terminal device may send the multiple pieces of uplink information to the network device according to the first indication information.

From the perspective of the terminal device, an implementation by which the terminal device sends the multiple pieces of uplink information to the network device after receiving the first indication information will be described below.

As one implementation, exemplarily, when the first indication information is used for indicating the terminal device to send the multiple pieces of uplink information on a first uplink channel of the multiple uplink channels, the multiple pieces of uplink information are sent to the network device on a Physical Uplink Control Channel (PUCCH), wherein the multiple pieces of uplink information includes acknowledgement/non-acknowledgement information corresponding to each downlink in the multiple downlinks, and/or Channel State Information (CSI) corresponding to each downlink in the multiple downlinks.

In other words, when the first indication information is used for indicating the terminal device to send the multiple pieces of uplink information on the first uplink channel of the multiple uplink channels, the network device may receive the multiple pieces of uplink information sent by the terminal device on the PUCCH, wherein the multiple pieces of uplink information include acknowledgement/non-acknowledgement information corresponding to each downlink in the multiple downlinks, and/or CSI corresponding to each downlink in the multiple downlinks.

As another implementation, exemplarily, when the first indication information is used for indicating the terminal device to send the multiple pieces of uplink information on the first uplink channel of the multiple uplink channels, the multiple pieces of uplink information are sent to the network device on a Physical Uplink Shared Channel (PUSCH), wherein the multiple pieces of uplink information includes uplink data, or the multiple pieces of uplink information includes the uplink data and at least one piece of the following information: acknowledgement/non-acknowledgement information corresponding to each downlink in the multiple downlinks, and Channel State Information (CSI) corresponding to each downlink in the multiple downlinks.

In other words, when the first indication information is used for indicating the terminal device to send the multiple pieces of uplink information on the first uplink channel of the multiple uplink channels, the network device may receive the multiple pieces of uplink information sent by the terminal device on the PUCCH, wherein the multiple pieces of uplink information include uplink data, or the multiple pieces of uplink information include the uplink data and at least one piece of the following information: acknowledgement/non-acknowledgement information corresponding to each downlink in the multiple downlinks, and CSI corresponding to each downlink in the multiple downlinks.

It should be understood that in the implementation of the present disclosure, if the terminal device needs to send uplink data to the network device, that is, when uplink data needs to be included in the multiple pieces of uplink information, the terminal device further needs to receive an uplink (UL) grant message of the uplink data sent by the network device before sending the multiple pieces of uplink information to the network device.

Specifically, before sending the multiple pieces of uplink information to the network device, the terminal device receives the UL grant message of the uplink data sent by the network device, and then according to the first indication information and the UL grant message, sends the multiple pieces of uplink information to the network device.

Optionally, the terminal device receives a second DCI sent by the network device, wherein the second DCI includes the UL grant message. That is, the network device may carry the UL grant message in the second DCI to send to the terminal device.

As one implementation, exemplarily, the network device may send the second DCI to the terminal device on a control channel corresponding to each downlink in the multiple downlinks; or, may send the second DCI to the terminal device on a control channel corresponding to a second downlink of the multiple downlinks.

For example, when the network device sends the second DCI to the terminal device on the control channel corresponding to each downlink in the multiple downlinks, the terminal device may receive the second DCI sent by the network device on a control channel corresponding to any downlink in the multiple downlinks. The method in the implementation of the present disclosure can effectively improve a success rate of detection of the terminal device.

For another example, when the network device sends the second DCI to the terminal device on the control channel corresponding to the second downlink of the multiple downlinks, the terminal device may receive the second DCI sent by the network device on the control channel corresponding to the second downlink of the multiple downlinks; that is, the network device and the terminal device transmit the second DCI by default on the control channel corresponding to the second downlink. The method in the implementation of the present disclosure can effectively reduce signaling overhead.

For another example, when the network device sends the second DCI to the terminal device on the control channel corresponding to any downlink in the multiple downlinks, the terminal device may receive the second DCI sent by the network device on a control channel corresponding to each downlink in the multiple downlinks. That is, the terminal device receives the second DCI sent by the network device through blind detection on control channels corresponding to the multiple downlinks. The method in the implementation of the present disclosure can effectively reduce signaling overhead.

As another implementation, exemplarily, the network device may select at least one downlink in the multiple downlinks; and then sends the second DCI to the terminal device on the at least one downlink.

For example, before sending the second DCI to the terminal device, the network device generates second indication information for indicating the terminal device to receive the second DCI on the at least one downlink; and sends the second indication information to the terminal device. At this time, the terminal device may receive the second DCI sent by the network device on a control channel corresponding to the at least one downlink according to the second indication information. The method in the implementation of the present disclosure can further reduce the complexity of the terminal device.

For another example, the network device may select the at least one downlink in the multiple downlinks according to quality information and/or load information of the multiple downlinks. At this time, the terminal device may also select the at least one downlink in the multiple downlinks according to the quality information and/or load information of the multiple downlinks, and then receive the second DCI sent by the network device on a control channel corresponding to the at least one downlink. The method in the implementation of the present disclosure can effectively improve a success rate of detection of the terminal device.

It should be understood that the method for the network device to send the UL grant message to the terminal device is only described exemplarily, and the implementation of the present disclosure is not limited thereto. For example, the network device may determine a downlink for sending the second DCI through negotiation with the terminal device.

Figure 4:
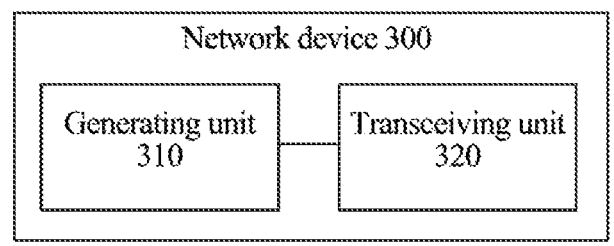
FIG. 4 is a schematic block diagram of a network device according to an implementation of the present disclosure.

FIG. 4 is a schematic diagram of a network device 300 according to an implementation of the present disclosure.

As shown in FIG. 4, the network device 300 includes a generating unit 310 and a transceiving unit 320.

The generating unit 310 is used for generating first indication information, wherein the first indication information is used for indicating a terminal device to simultaneously send multiple pieces of uplink information corresponding to multiple downlinks on multiple uplink channels, or the first indication information is used for indicating the terminal device to send the multiple pieces of uplink information on the multiple uplink channels in a time division multiplexing mode, or the first indication information is used for indicating the terminal device to send the multiple pieces of uplink information on a first uplink channel of the multiple uplink channels.

The transceiving unit 320 is used for sending the first indication information to the terminal device.

Optionally, the generating unit 310 is specifically used for generating the first indication information according to at least one piece of the following information: interaction capabilities between multiple Transmission Reception Points (TRPs) corresponding to the multiple downlinks, interaction capabilities between multiple beams corresponding to the multiple downlinks, interaction capabilities between multiple cells to which the multiple TRPs belong, interaction capabilities between multiple cells to which the multiple beams belong, report information of the terminal device, service information of the multiple downlinks, and network load information.

Optionally, the report information includes at least one piece of the following information:

capability information indicating whether the terminal device supports to send the multiple pieces of uplink information on the multiple uplink channels, information about a Multiple-Input Multiple-Output (MIMO) capability of the terminal device, level information of the terminal device, and a Power Headroom Report (PHR) of the terminal device.

Optionally, the transceiving unit 320 is specifically used for sending a Radio Resource Control (RRC) signaling to the terminal device, wherein the RRC signaling includes the first indication information; or, sending a Media Access Control (MAC) Control Cell (CE) to the terminal device, wherein the MAC CE includes the first indication information.

Optionally, the transceiving unit 320 is specifically used for sending first Downlink Control Information (DCI) to the terminal device, wherein the first DCI includes the first indication information.

Optionally, the transceiving unit 320 is further specifically used for sending the first DCI to the terminal device on a control channel corresponding to each downlink in the multiple downlinks; or, sending the first DCI to the terminal device on a control channel corresponding to a first downlink in the multiple downlinks.

Optionally, the transceiving unit 320 is further used for receiving the multiple pieces of uplink information sent by the terminal device.

Optionally, the transceiving unit 320 is specifically used for, when the first indication information is used for indicating the terminal device to send the multiple pieces of uplink information on the first uplink channel of the multiple uplink channels, receiving the multiple pieces of uplink information sent by the terminal device on a PUCCH, wherein the multiple pieces of uplink information include acknowledgement/non-acknowledgement information corresponding to each downlink in the multiple downlinks, and/or CSI corresponding to each downlink in the multiple downlinks.

Optionally, the transceiving unit 320 is specifically used for, when the first indication information is used for indicating the terminal device to send the multiple pieces of uplink information on the first uplink channel of the multiple uplink channels, receiving the multiple pieces of uplink information sent by the terminal device on a PUSCH, wherein the multiple pieces of uplink information include uplink data, or the multiple pieces of uplink information include the uplink data and at least one piece of the following information: acknowledgement/non-acknowledgement information corresponding to each downlink in the multiple downlinks, and CSI corresponding to each downlink in the multiple downlinks.

Optionally, the transceiving unit 320 is further used for, before receiving the multiple pieces of uplink information sent by the terminal device, sending an uplink (UL) grant message of uplink data to the terminal device.

Optionally, sending the UL grant message of uplink data to the terminal device includes: sending second Downlink Control Information (DCI) to the terminal device, wherein the second DCI includes the UL grant message.

Optionally, the transceiving unit 320 is specifically used for sending the second DCI to the terminal device on a control channel corresponding to each downlink in the multiple downlinks; or, sending the second DCI to the terminal device on a control channel corresponding to a second downlink of the multiple downlinks.

Optionally, the transceiving unit 320 is specifically used for selecting at least one downlink in the multiple downlinks; and sending the second DCI to the terminal device on the at least one downlink.

Optionally, the generating unit 310 is further used for, before sending the second Downlink Control Information (DCI) to the terminal device, generating second indication information, wherein the second indication information is used for indicating the terminal device to receive the second DCI on the at least one downlink; and the transceiving unit 320 is further used for sending the second indication information to the terminal device.

Optionally, the transceiving unit 320 is specifically used for selecting the at least one downlink in the multiple downlinks according to quality information and/or load information of the multiple downlinks.

Figure 5:
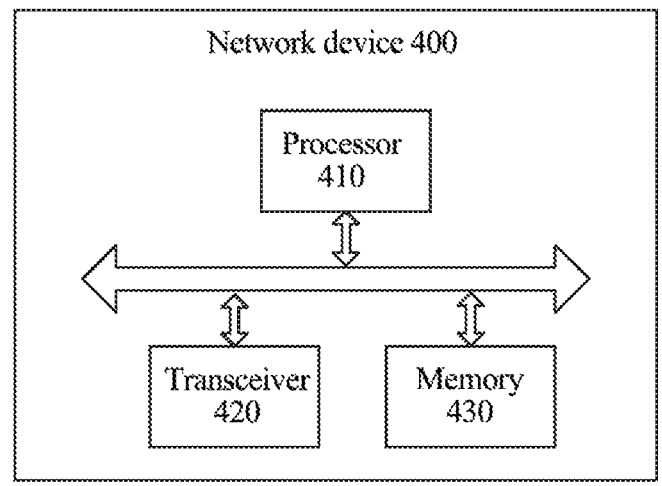
FIG. 5 is another schematic block diagram of a network device according to an implementation of the present disclosure.

It should be noted that in the implementation of the present disclosure, the generating unit 310 may be implemented by a processor, and the transceiving unit 320 may be implemented by a transceiver. As shown in FIG. 5, a network device 400 may include a processor 410, a transceiver 420, and a memory 430. The memory 430 may be used for storing indication information, and may be further used for storing codes, instructions, etc., executed by the processor 410. Various components in the network device 400 are connected by a bus system. The bus system includes a power bus, a control bus and a status signal bus in addition to a data bus.

The network device 400 shown in FIG. 5 can implement the various processes implemented by the network device in the method implementation of FIG. 3 described above. In order to avoid duplication, the details will not be repeated here.

Figure 6:
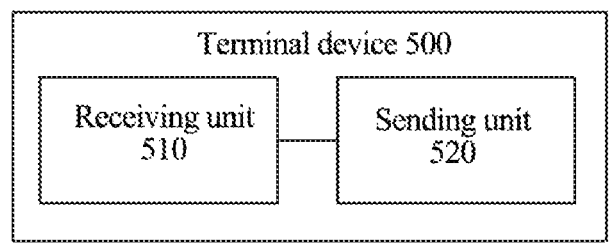
FIG. 6 is a schematic block diagram of a terminal device according to an implementation of the present disclosure.

FIG. 6 is a schematic block diagram of a terminal device 500 according to an implementation of the present disclosure.

As shown in FIG. 6, the terminal device 500 includes a receiving unit 510 and a sending unit 520.

The receiving unit 510 is used for receiving first indication information sent by the network device, wherein the first indication information is used for indicating the terminal device to simultaneously send multiple pieces of uplink information corresponding to multiple downlinks on multiple uplink channels, or the first indication information is used for indicating the terminal device to send the multiple pieces of uplink information on the multiple uplink channels in a time division multiplexing mode, or the first indication information is used for indicating the terminal device to send the multiple pieces of uplink information on a first uplink channel of the multiple uplink channels.

The sending unit 520 is used for sending the multiple pieces of uplink information to the network device according to the first indication information.

Optionally, the receiving unit 510 is specifically used for receiving a Radio Resource Control (RRC) signaling sent by the network device, wherein the RRC signaling includes the first indication information; or, receiving a Media Access Control (MAC) Control Cell (CE) sent by the network device, wherein the MAC CE includes the first indication information.

Optionally, the receiving unit 510 is specifically used for receiving first Downlink Control Information (DCI) sent by the network device, wherein the first DCI includes the first indication information.

Optionally, the receiving unit 510 is specifically used for receiving the first DCI sent by the network device on a control channel corresponding to any downlink of the multiple downlinks; or, receiving the first DCI sent by the network device on a control channel corresponding to a first downlink of the multiple downlinks.

Optionally, the sending unit 520 is specifically used for, when the first indication information is used for indicating the terminal device to send the multiple pieces of uplink information on the first uplink channel of the multiple uplink channels, sending the multiple pieces of uplink information to the network device on a PUCCH, wherein the multiple pieces of uplink information include acknowledgement/non-acknowledgement information corresponding to each downlink in the multiple downlinks, and/or CSI corresponding to each downlink in the multiple downlinks.

Optionally, the sending unit 520 is specifically used for, when the first indication information is used for indicating the terminal device to send the multiple pieces of uplink information on the first uplink channel of the multiple uplink channels, sending the multiple pieces of uplink information to the network device on a PUSCH, wherein the multiple pieces of uplink information include uplink data, or the multiple pieces of uplink information include the uplink data and at least one piece of the following information: acknowledgement/non-acknowledgement information corresponding to each downlink in the multiple downlinks, and CSI corresponding to each downlink in the multiple downlinks.

Optionally, the receiving unit 510 is further used for, before sending the multiple pieces of uplink information to the network device according to the first indication information, receiving an uplink (UL) grant message of uplink data sent by the network device; wherein the sending unit 520 is further used for sending the multiple pieces of uplink information to the network device according to the first indication information and the UL grant message.

Optionally, the receiving unit 510 is specifically used for receiving second Downlink Control Information (DCI) sent by the network device, wherein the second DCI includes the UL grant message.

Optionally, the receiving unit 510 is specifically used for receiving the second DCI sent by the network device on a control channel corresponding to any downlink of the multiple downlinks; or, receiving the second DCI sent by the network device on a control channel corresponding to a second downlink of the multiple downlinks; or, receiving the second DCI sent by the network device on a control channel corresponding to each downlink in the multiple downlinks.

Optionally, the receiving unit 510 is specifically used for receiving the second DCI sent by the network device on a control channel corresponding to at least one downlink of the multiple downlinks.

Optionally, the receiving unit 510 is further used for, before receiving the second Downlink Control Information (DCI) sent by the network device, receiving second indication information sent by the network device, wherein the second indication information is used for indicating the terminal device to receive the second DCI sent by the network device on the at least one downlink, and the at least one downlink is a downlink selected by the network device in the multiple downlinks; and receiving the second DCI sent by the network device on a control channel corresponding to the at least one downlink according to the second indication information.

Optionally, the receiving unit 510 is further used for, before receiving the Downlink Control Information (DCI) sent by the network device, selecting the at least one downlink in the multiple downlinks.

Optionally, the receiving unit 510 is specifically used for selecting the at least one downlink in the multiple downlinks according to quality information and/or load information of the multiple downlinks.

Figure 7:
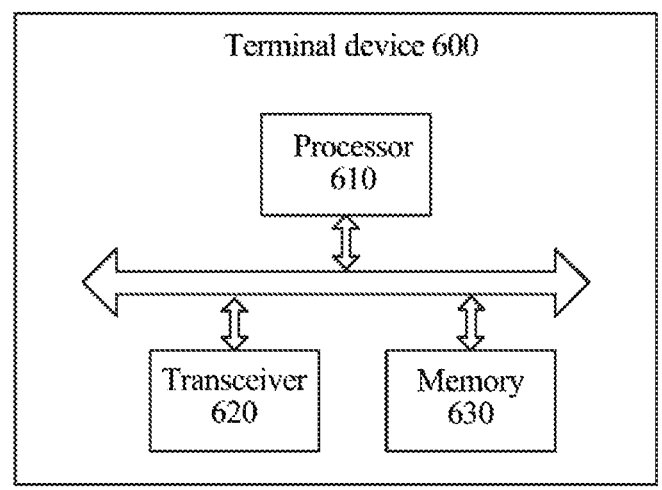
FIG. 7 is another schematic block diagram of a terminal device according to an implementation of the present disclosure.

It should be noted that in the implementation of the present disclosure, both the receiving unit 510 and the sending unit 520 may be implemented by a transceiver. As shown in FIG. 7, a terminal device 600 may include a processor 610, a transceiver 620, and a memory 630. The memory 630 may be used for storing indication information, and may be further used for storing codes, instructions, etc., executed by the processor 610. Various components in the terminal device 600 are connected by a bus system. The bus system includes a power bus, a control bus and a status signal bus in addition to a data bus.

The terminal device 600 shown in FIG. 7 can implement the various processes implemented by the terminal device in the method implementation of FIG. 3 described above. In order to avoid duplication, the details will not be repeated here.

That is, method implementations in the implementations of the present disclosure may be applied to or implemented by a processor. The processor may be an integrated circuit chip with a signal processing capability. In the implementation process, the actions of the method implementations described above may be completed by integrated logic circuits of hardware in the processor or instructions in the form of software. The above processor may be a general purpose processor, a digital signal processor (DSP), an application specific integrated circuit (ASIC), a field programmable gate array (FPGA) or other programmable logic devices, a transistor logic device, or a discrete hardware component. The processor may implement or execute the disclosed methods, acts and logical block diagrams in the implementations of the present disclosure. The general purpose processor may be a microprocessor or the processor may be any conventional processor or the like. The acts of the methods disclosed in combination with the implementations of the present disclosure may be directly embodied as to be executed and accomplished by a hardware decoding processor or by a combination of hardware and software modules in a decoding processor. Software modules may be located in a typical storage medium in the art, such as, a random access memory (RAM), a flash memory, a read-only memory, a programmable read-only memory, an electrical erasable programmable memory, or a register. The storage medium is located in a memory, and the processor reads information in the memory and completes the actions of the above method in combination with its hardware.

It should be understood that the memory in the implementation of the present disclosure may be a transitory memory or a non-transitory memory, or it may include both transitory and non-transitory memory. The non-transitory memory may be a read-only memory (ROM), a programmable ROM (PROM), an erasable PROM (EPROM), an electrically erasable EPROM (EEPROM), or a flash memory. The transitory memory may be a Random Access Memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synch link DRAM (SLDRAM), and a Direct Rambus RAM (DR RAM). It should be noted that memories of the systems and methods described herein are intended to include, but are not limited to, these and any other suitable types of memories.

Finally, it should be noted that the terms used in the implementations of the present disclosure and the appended claims are for the purpose of describing specific implementations only and are not intended to limit the implementations of the present disclosure.

For example, the singular forms "a", "said", and "the" used in the implementations of the present disclosure and the appended claims are intended to include the plural forms unless the context clearly indicates other meanings.

For another example, the terms "first type cell group" and "second type cell group" may be used in the implementations of the present disclosure, but these type cell groups should not be limited to these terms. These terms are only used for distinguishing type cell groups from each other.

For another example, depending on the context, the word "when" as used herein may be interpreted as "if" or "whether" or "while" or "in response to a determination of/that" or "in response to a detection of/that". Similarly, depending on the context, the phrase "if it is determined that" or "if it is detected that (a stated condition or event)" may be interpreted as "when . . . is determined" or "in response to a determination of/that" or "when (stated condition or event) is detected" or "in response to a detection of/that (stated condition or event)".

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of technical solutions. One skilled in the art may use different methods to implement the described functions for each particular application, but such implementation should not be considered to be beyond the scope of implementations of the present disclosure.

Those skilled in the art may clearly understand that for convenience and conciseness of description, the specific working processes of the systems, apparatuses and units described above may refer to the corresponding processes in the aforementioned method implementations, and details are not described herein again.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division modes in actual implementations, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and components shown as units may or may not be physical units, i.e., they may be located in one place or may be allocated over multiple network units. Parts or all of the units can be selected according to actual needs to achieve the purpose of the implementations of the present disclosure.

In addition, various functional units in the implementations of the present disclosure may be integrated in one processing unit, or the various units may be presented separately in a physical way, or two or more units may be integrated in one unit.

Function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in various implementations of the present disclosure. The aforementioned storage medium includes a medium capable of storing program codes, such as, a U disk, a mobile hard disk, a read-only memory (ROM), a magnetic disk or an optical disk, etc.

What are described above are merely specific implementations of the implementations of the present disclosure, but the protection scope of the implementations of the present disclosure is not limited thereto. Any modification or substitution that can be easily conceived by a person skilled in the art within the technical scope disclosed by the implementations of the present disclosure shall be included within the protection scope of the implementations of the present disclosure. Therefore, the scope of protection of the implementations of the present disclosure should be subject to the scope of protection of the claims.

The invention claimed is:

1. A data transmission method, comprising:
    sending, by a network device, downlink information to a terminal device through multiple downlinks;
    generating, by the network device, first indication information and sending, by the network device, the terminal device the first indication information by using a Radio Resource Control (RRC) signaling, wherein the first indication information is used for indicating the terminal device to send multiple pieces of uplink information on multiple uplink channels in a time division multiplexing mode or the first indication information is used for indicating the terminal device to send the multiple pieces of uplink information on a first uplink channel of the multiple uplink channels, wherein the multiple pieces of uplink information correspond to the multiple downlinks;
    sending, by the network device, an uplink (UL) grant message to the terminal device by using Downlink Control Information (DCI); and
    receiving, by the network device, the multiple pieces of uplink information sent by the terminal device, comprising:
        when the first indication information is used for indicating the terminal device to send the multiple pieces of uplink information on the multiple uplink channels in the time division multiplexing mode, receiving the multiple pieces of uplink information sent by the terminal device on a Physical Uplink Control Channel (PUCCH), wherein the multiple pieces of uplink information comprise acknowledgement/non-acknowledgement information corresponding to each downlink in the multiple downlinks, and
        when the first indication information is used for indicating the terminal device to send the multiple pieces of uplink information on the first uplink channel of the multiple uplink channels, receiving the multiple pieces of uplink information sent by the terminal device on a Physical Uplink Shared Channel (PUSCH), wherein the multiple pieces of uplink information comprise the uplink data and the acknowledgement/non-acknowledgement information corresponding to each downlink in the multiple downlinks.

2. The method according to claim 1, wherein generating, by the network device, the first indication information comprises:
    generating the first indication information according to interaction capabilities between multiple beams corresponding to the multiple downlinks.

3. The method according to claim 1, wherein sending, by the network device, the UL grant message to the terminal device by using the DCI comprises:

sending the DCI to the terminal device on a control channel corresponding to a second downlink of the multiple downlinks.

4. The method according to claim 1, wherein sending, by the network device, the UL grant message to the terminal device by using the DCI comprises:
selecting at least one downlink in the multiple downlinks; and
sending the DCI to the terminal device on the selected at least one downlink.

5. The method according to claim 1, wherein generating the first indication information comprises:
generating the first indication information according to at least one piece of the following information:
interaction capabilities between multiple Transmission Reception Points (TRPs) corresponding to the multiple downlinks, interaction capabilities between multiple beams corresponding to the multiple downlinks, interaction capabilities between multiple cells to which the multiple TRPs belong, interaction capabilities between multiple cells to which the multiple beams belong, report information of the terminal device, service information of the multiple downlinks, and network load information.

6. The method according to claim 5, wherein the report information comprises at least one piece of the following information:
capability information indicating whether the terminal device supports to send the multiple pieces of uplink information on the multiple uplink channels, information about a Multiple-Input Multiple-Output (MIMO) capability of the terminal device, level information of the terminal device, and a Power Headroom Report (PHR) of the terminal device.

7. The method according to claim 1, wherein sending, by the network device, the UL grant message to the terminal device by using the DCI comprises:
sending the DCI to the terminal device on a control channel corresponding to each downlink in the multiple downlinks; or
sending the DCI to the terminal device on a control channel corresponding to a second downlink of the multiple downlinks; or
selecting at least one downlink in the multiple downlinks, and sending the DCI to the terminal device on the at least one downlink.

8. A network device, comprising a processor and a transceiver, wherein,
the transceiver is configured to send downlink information to a terminal device through multiple downlinks;
the processor is configured to generate first indication information, wherein the first indication information is used for indicating the terminal device to send multiple pieces of uplink information on multiple uplink channels in a time division multiplexing mode or the first indication information is used for indicating the terminal device to send the multiple pieces of uplink information on a first uplink channel of the multiple uplink channels, wherein the multiple pieces of uplink information correspond to the multiple downlinks; and
the transceiver is further configured to:
send the terminal device the first indication information by using a Radio Resource Control (RRC) signaling;
send an uplink (UL) grant message to the terminal device by using Downlink Control Information (DCI); and receive the multiple pieces of uplink information sent by the terminal device comprising:
when the first indication information is used for indicating the terminal device to send the multiple pieces of uplink information on the multiple uplink channels in the time division multiplexing mode, receive the multiple pieces of uplink information sent by the terminal device on a Physical Uplink Control Channel (PUCCH), wherein the multiple pieces of uplink information comprises acknowledgement/non-acknowledgement information corresponding to each downlink in the multiple downlinks, and
when the first indication information is used for indicating the terminal device to send the multiple pieces of uplink information on the first uplink channel of the multiple uplink channels, receive the multiple pieces of uplink information sent by the terminal device on a Physical Uplink Shared Channel (PUSCH), wherein the multiple pieces of uplink information comprise the uplink data and the acknowledgement/non-acknowledgement information corresponding to each downlink in the multiple downlinks.

9. The network device according to claim 8, wherein the processor is further configured to:
generate the first indication information according to interaction capabilities between multiple Transmission Reception Points (TRPs) corresponding to the multiple downlinks and report information of the terminal device.

10. The network device according to claim 9, wherein the report information comprises at least one piece of the following information:
capability information indicating whether the terminal device supports to send the multiple pieces of uplink information on the multiple uplink channels, information about a Multiple-Input Multiple-Output (MIMO) capability of the terminal device, level information of the terminal device, and a Power Headroom Report (PHR) of the terminal device.

11. The network device according to claim 8, wherein the transceiver is further configured to:
send first Downlink Control Information (DCI) to the terminal device, wherein the first DCI comprises the first indication information.

12. The network device according to claim 11, wherein the transceiver is further configured to:
send the first DCI to the terminal device on a control channel corresponding to each downlink in the multiple downlinks; or send the first DCI to the terminal device on a control channel corresponding to a first downlink of the multiple downlinks.

13. The network device according to claim 8, wherein the transceiver is further configured to:
send the DCI to the terminal device on a control channel corresponding to a second downlink of the multiple downlinks.

14. The network device according to claim 8, wherein the transceiver is further configured to:
select at least one downlink in the multiple downlinks; and
send the DCI to the terminal device on the at least one downlink.

15. A terminal device, comprising a transceiver, wherein,
the transceiver is configured to receive downlink information sent by a network device through multiple downlinks;
the transceiver is further configured to receive first indication information sent by the network device by using a Radio Resource Control (RRC) signaling, wherein the first indication information is used for indicating the terminal device to send multiple pieces of uplink information on multiple uplink channels in a time division multiplexing mode or the first indication information is used for indicating the terminal device to send the multiple pieces of uplink information on a first uplink channel of the multiple uplink channels, wherein the multiple pieces of uplink information correspond to the multiple downlinks;
the transceiver is further configured to receive an uplink (UL) grant message sent by the network device by using Downlink Control Information (DCI); and
the transceiver is further configured to send the multiple pieces of uplink information to the network device according to the first indication information, comprising:
when the first indication information is used for indicating the terminal device to send the multiple pieces of uplink information on the multiple uplink channels in the time division multiplexing mode, send the multiple pieces of uplink information to the network device on a Physical Uplink Control Channel (PUCCH), wherein the multiple pieces of uplink information comprises acknowledgement/non-acknowledgement information corresponding to each downlink in the multiple downlinks, and
when the first indication information is used for indicating the terminal device to send the multiple pieces of uplink information on the first uplink channel of the multiple uplink channels, send the multiple pieces of uplink information to the network device on a Physical Uplink Shared Channel (PUSCH), wherein the multiple pieces of uplink information comprise the uplink data and the acknowledgement/non-acknowledgement information corresponding to each downlink in the multiple downlinks.

16. The terminal device according to claim 15, wherein the transceiver is further configured to:
receive first Downlink Control Information (DCI) sent by the network device, wherein the first DCI comprises the first indication information.

17. The terminal device according to claim 16, wherein the transceiver is further configured to:
receive the first DCI sent by the network device on a control channel corresponding to any downlink of the multiple downlinks; or receive the first DCI sent by the network device on a control channel corresponding to a first downlink of the multiple downlinks.

18. The terminal device according to claim 15, wherein the first indication information is generated according to interaction capabilities between multiple Transmission Reception Points (TRPs) corresponding to the multiple downlinks.

19. The terminal device according to claim 15, wherein the transceiver is further configured to:
receive the DCI sent by the network device on a control channel corresponding to a second downlink of the multiple downlinks.

20. The terminal device according to claim 15, wherein the transceiver is further configured to:
receive the DCI sent by the network device on at least one downlink in the multiple downlinks.

* * * * *